(12) United States Patent
Smith et al.

(10) Patent No.: US 12,295,386 B2
(45) Date of Patent: May 13, 2025

(54) PROTEIN COMPOSITIONS FOR PLANT-BASED FOOD PRODUCTS AND METHODS FOR MAKING

(71) Applicant: Glanbia Nutritionals Limited, Kilkenny (IE)

(72) Inventors: Tucker J. Smith, Twin Falls, ID (US); Michael J. Young, Kimberly, ID (US); Brent L. Petersen, Twin Falls, ID (US); Loren S. Ward, Twin Falls, ID (US)

(73) Assignee: Glanbia Nutritionals Limited, Kilkenny (IE)

(*) Notice: Subject to any disclaimer, the term of this patent is extended or adjusted under 35 U.S.C. 154(b) by 470 days.

(21) Appl. No.: 17/567,091

(22) Filed: Dec. 31, 2021

(65) Prior Publication Data

US 2022/0117261 A1    Apr. 21, 2022

Related U.S. Application Data

(63) Continuation of application No. PCT/US2020/064621, filed on Dec. 11, 2020.

(60) Provisional application No. 62/986,755, filed on Mar. 8, 2020, provisional application No. 62/946,903, filed on Dec. 11, 2019.

(51) Int. Cl.
| | |
|---|---|
| *A23J 3/14* | (2006.01) |
| *A23C 20/02* | (2021.01) |
| *A23J 3/22* | (2006.01) |
| *A23J 3/34* | (2006.01) |

(52) U.S. Cl.
CPC .............. *A23J 3/14* (2013.01); *A23C 20/025* (2013.01); *A23J 3/227* (2013.01); *A23J 3/346* (2013.01)

(58) Field of Classification Search
None
See application file for complete search history.

(56) References Cited

U.S. PATENT DOCUMENTS

| | | |
|---|---|---|
| 4,176,202 A | 11/1979 | Decker et al. |
| 4,720,390 A | 1/1988 | Baechler et al. |
| 6,908,634 B2 | 6/2005 | Hwang |
| 2015/0257403 A1 | 9/2015 | Sanz-Valero et al. |
| 2015/0305390 A1 | 10/2015 | Vrljic et al. |
| 2017/0105438 A1* | 4/2017 | Ajami ................. A23L 13/42 |
| 2017/0238590 A1* | 8/2017 | Bansal-Mutalik ...... A23J 1/148 |
| 2018/0027851 A1 | 2/2018 | Vrljic et al. |
| 2018/0295857 A1 | 10/2018 | Maningat et al. |
| 2019/0191735 A1 | 6/2019 | Bansal-Mutalik et al. |
| 2019/0261648 A1 | 8/2019 | Zhang |

FOREIGN PATENT DOCUMENTS

| | | | |
|---|---|---|---|
| CN | 101703147 A | 5/2010 | |
| CN | 104256402 A | 1/2015 | |
| CN | 105050422 A | 11/2015 | |
| CN | 108471779 A | 8/2018 | |
| CN | 108783460 A | 11/2018 | |
| EP | 3427595 A1 | 1/2019 | |
| JP | S61268141 A | 11/1986 | |
| JP | 2014087316 A | 5/2014 | |
| JP | 2016502868 A | 2/2016 | |
| WO | WO-2013010037 A1 * | 1/2013 | ........... A23C 11/106 |
| WO | 2014110539 A1 | 7/2014 | |
| WO | 2014110540 A1 | 7/2014 | |
| WO | WO-2014156549 A1 * | 10/2014 | ........... A23C 20/005 |
| WO | 2017143301 A1 | 8/2017 | |
| WO | 2018115594 A1 | 6/2018 | |

OTHER PUBLICATIONS

Foreign ref with translation.*
Patent Cooperation Treaty, International Search Report and Written Opinion for PCT/US2020/04621, 10 pages, dated Apr. 5, 2021.
Shand, P, et al., "Physicochemical and textural properties of heat-induced pea protein isolate gels", Food Chemistry 102, 1119-1130 (2007).
Shand, P, et al., "Transglutaminase treatment of pea proteins: Effect on physicochemical and rheological properties of heat-induced protein gels", Food Chemistry 107, 692-699 (2008).
Lu, J., et al., "The emulsifying properties of pea proteins and the molecular mechanism that affected the emulsifying properties", Food and Machinery 34(1), 7-12 (2018). [English Abstract].
Gharsallaoui, A, et al., "Utilisation of pectin coating to enhance spray-dry stability of pea protein-stabilised oil-in-water emulsions", Food Chemistry 122, 447-454 (2010).
Tamm, F, et al., "Functional properties of pea protein hydrolysates in emulsions and spray-dried microcapsules", Food Hydrocolloids 58, 204-214 (2016).

\* cited by examiner

*Primary Examiner* — Jyoti Chawla
(74) *Attorney, Agent, or Firm* — Viksnins Harris Padys Malen LLP

(57) ABSTRACT

Disclosed is a method for making protein emulsions for use in making products such as meat substitutes, meat extenders, egg substitutes, dairy analogues, etc., as well as methods for using the emulsion(s) to make various meat substitutes, egg substitutes, dairy analogues, etc. Also disclosed are vegetable protein crumbles for use as meat substitutes, either alone or in combination with the emulsion(s).

6 Claims, 15 Drawing Sheets

PROTEIN COMPOSITIONS FOR PLANT-BASED FOOD PRODUCTS AND METHODS FOR MAKING

FIELD OF THE INVENTION

The invention relates to compositions which can be categorized as meat analogues or meat substitutes, these compositions comprising vegetable protein. The invention can more specifically be described as a vegan meat substitute and methods for making vegan meat substitutes and dairy analogs.

BACKGROUND OF THE INVENTION

Analysts predict that the market for alternative meat could reach $140 billion within the next ten years, potentially capturing about 10% of the $1.4 trillion global meat market. Consumer acceptance of plant-based meat substitutes has increased, fueled largely by a combination of the health benefits of plant-based nutrition and the potential to decrease the environmental impacts of meat production to meet the needs of an ever-increasing human population. A multitude of new meatless protein products and brands have been developed, all with the goal of providing plant-based protein products with the taste and texture of meat.

Generally, those same consumers who consider plant-based meat substitutes to be an attractive nutritional option also prefer foods that can be considered to be "clean"-label foods (i.e., foods produced using as few ingredients as possible, those ingredients being items that consumers recognize and consider to be healthy). However, in order to achieve a consistency, texture, and taste that is acceptable in plant-based meat substitutes, manufacturers have generally found it necessary to incorporate lists of ingredients that one author, writing about some of the newest products on the market, referred to as "sprawling." Examples of some product ingredient lists are shown below in Table 1.

TABLE 1

Ingredients Listed on Product Packaging of Commercially-Available Meat Substitutes

| Product | Ingredients Listed on Product Packaging |
|---|---|
| Morningstar Farms ® Original Sausage Patties | Water, wheat gluten, soy protein concentrate, corn oil, soy flour, egg whites, sodium caseinate, modified tapioca starch, contains two percent or less of: soy protein isolate, lactose, soybean oil, methylcellulose, autolyzed yeast extract, spices, natural and artificial flavors, sodium tripolyphosphate, salt, modified corn starch, hydrolyzed wheat gluten, disodiuminosinate, caramel color, whey, hydrolyzed corn gluten, hydrolyzed soy protein, potassium chloride, dextrose, onion powder, disodium guanylate, tetrasodium pyrophosphate, tricalcium phosphate, hydrolyzed wheat protein, sodium hexametaphosphate, succinic acid, niacinamide, monosodium phosphate, lactic acid, brewer's yeast, Torula yeast, calcium phosphate, soy lecithin, iron (ferrous sulfate), magnesium carbonate, vitamin B1 (thiamin mononitrate), vitamin B6 (pyridoxine hydrochloride), vitamin B2 (riboflavin), vitamin B12. |
| Beyond Burger ® | Water, pea protein isolate, expeller-pressed canola oil, refined coconut oil, 2% or less of: cellulose from bamboo, methylcellulose, potato starch, natural flavor, maltodextrin, yeast extract, salt, sunflower oil, vegetable glycerin, dried yeast, gum arabic, citrus extract, ascorbic acid, beet juice extract, acetic acid, succinic acid, modified food starch, annatto. |
| Loma Linda ® FriChik ® | Textured Vegetable Protein (Soy Protein Isolate, Soy Protein Concentrate, Wheat Gluten, Water for Hydration), Water, Soybean Oil, Egg Whites, Corn Oil. Contains 2% or less of Salt, Dextrose, Corn Starch, Potassium Chloride, Disodium Inosinate, Phosphoric Acid, Hydrolyzed Soy Protein, Modified Corn Starch, Guar Gum, Baking Powder (Corn Starch, Sodium Aluminum Phosphate, Sodium Bicarbonate, Monocalcium Phosphate), Onion Powder, Carrageenan, Vitamins and minerals (Niacinamide, Iron (Ferrous Sulfate), Vitamin B1 (Thiamin Mononitrate), Bitamin B6 (Pyridoxine Hydrochloride), Vitamin B2 (Riboflavin), Vitamin B12 (Cyanocobalamin), Natural Flavors from Non-Meat Sources, Wheat Fiber, Nonfat Dry Milk. |
| Meatless Farm ® Burger | Water, Soy Protein Concentrate, Soy Protein Isolate, Canola Oil, Pea Protein, Shea Oil, Coconut Oil, Inulin, Methylcellulose, Caramelized Carrot Concentrate, Carrot Fiber, Rice Protein, Vegetable and Fruit Extract Colors (Beetroot, Radish, Tomato), Yeast Extracts, Natural Flavor, Carrot Concentrate, Soy Lecithin, Ascorbic Acid (Antioxidant), Salt, Vitamins and Minerals (Niacin, Zinc, Iron, Vitamin B6, Vitamin B2, Vitamin B1, Vitamin B12). |
| Impossible Burger ® | Water, Soy Protein Concentrate, Coconut Oil, Sunflower Oil, Natural Flavors, 2% or less of: Potato Protein, Methylcellulose, Yeast Extract, Cultured Dextrose, Food Starch Modified, Soy Leghemoglobin, Salt, Soy Protein Isolate, Mixed Tocopherols (Vitamin E), Zinc Gluconate, Thiamine Hydrochloride (Vitamin B1), Sodium Ascorbate (Vitamin C), Niacin, Pyridoxine Hydrochloride (Vitamin B6), Riboflavin (Vitamin B2), Vitamin B12. |
| Quorn ® Meatless Fillets | Mycoprotein (88%), Potato Protein, Pea Fiber. Contains 2% or less of Water, Calcium Chloride, Wheat Gluten, Yeast Extract, Calcium Acetate, Carrageenan, Sodium Alginate, Onion Powder, Sage, Sugar. |
| Gardein ® Chik'n | Water, soy protein isolate, vital wheat gluten, yeast extract, natural flavors (from plant sources), organic cane sugar, expeller pressed/canola oil, sea salt, onion powder, pea protein, carrot fiber, extractives of paprika & turmeric. |
| Dr Praeger's Sensible Foods ® All American Veggie Burgers | Hydrated Pea Protein (Water, Pea Protein), Avocado Oil, Onions, Sweet Potato Puree, Butternut Squash Puree, Carrot Puree, Natural Flavors, Methyl Cellulose, Fruit Juice Color, Oat Fiber, Potato Starch, Roasted Garlic, Sea Salt |

The most common proteins utilized in meat substitutes are soy protein and wheat gluten, primarily because of the processing advantages they provide, as well as their abundant availability and low cost, but pea protein is becoming a more and more attractive option because it is the plant protein highest in the amino acid leucine and is a sustainable source of protein. Pea protein is also rich in arginine and lysine. As Shand et al. noted, pea protein products "have been reported to exhibit comparable and complementary functionality to homologous soybean protein products, however, it has been noted that heat-induced gels of pea proteins were weaker than soy protein gels." (Shand, P. J., et al. Physicochemical and textural properties of heat-induced pea protein isolate gels, *Food Chemistry* 102 (2007) 1119-1130.)

This is important because formulating meat substitutes generally involves producing gelatinized matrices, or gels, comprising one or more plant proteins.

Shand later reported that use of transglutaminase "allowed for preparation of PPIc gels of similar strength and elasticity as commercial soy protein isolate gels and commercial meat bologna." (Shand, P. J., et al. Transglutaminase treatment of pea proteins: Effect on physicochemical and rheological properties of heat-induced protein gels, *Food Chemistry*, 107 (2008) 692-699.) Transglutaminase catalyzes the crosslinking of proteins and has been used to produce meat, meat substitute, and other products in the food industry. However, soy protein products traditionally have also required other ingredients, as illustrated by the ingredient lists in Table 1, so simply raising the pea protein gel to a similar strength and elasticity as that of soy protein isolate has not eliminated the need for additional ingredients such as wheat gluten, cellulose, methylcellulose, etc.

What are needed in the field of meat substitutes are new methods and products that provide meat-like products comprising vegetable proteins, such as pea protein, for example, which can be made with fewer ingredients than are found in current products on the market, meeting the need for more "clean label" meat substitutes.

SUMMARY OF THE INVENTION

The invention relates to a method for producing a product characterized as a meat substitute, and products made by the method in its various aspects and embodiments. The method comprises the steps of admixing water and protein powder to produce a protein slurry, homogenizing the slurry with at least one fat to produce a pea protein emulsion, drying the emulsion to produce a solid-state emulsion, and admixing the solid-state emulsion with water and at least one transglutaminase to produce an admixture which, after an incubation period of from about 15 minutes to about 8 hours, comprises a meat substitute composition. The meat substitute can then be formed into pieces of desired size and shape. In aspects of the invention, the emulsion comprises from about 65 percent to about 95 percent water. In certain aspects, the emulsion comprises about 85 percent water. In various aspects, oil is present in the emulsion at a ratio in the range of from about one parts oil to about 19 parts pea protein to from about one parts oil to about 0.5 parts pea protein. In some aspects of the invention, the ratio of oil to protein in the emulsion is a 1:3 ratio. During the homogenization step, flavor(s) and color(s) can optionally be added, as desired. Drying can be achieved using methods known to those of skill in the art, such as freeze-drying and spray-drying. In various aspects of the invention, the emulsion is dried using the process of spray-drying.

In various aspects or embodiments of the invention, the solid-state emulsion is admixed with water wherein the water comprises from about 60 to about 75 percent of the admixture, and in various aspects of the invention transglutaminase is added at from about 0.01 percent to about 0.2 percent of the admixture.

The invention also provides a method for producing a vegan dairy analogue, as well as various dairy products made by the method. The method comprises the steps of admixing water and protein powder to produce a protein slurry, homogenizing the slurry with at least one fat (e.g., an oil) to produce a pea protein emulsion, drying the emulsion to produce a solid-state emulsion, then admixing the solid-state emulsion with water, at least one transglutaminase, and at least one protease to produce an admixture which, after an incubation period of at least about 15 minutes, comprises a vegan dairy composition. To produce a vegan dairy cheese, for example, incubation time may be extended, as transglutaminase would be in the mixture as the cheese product underwent further processing, such as aging. Extended incubation of product to allow protease action to fully develop product flavor and texture may be performed for a matter of days, for example. In aspects of the invention, the emulsion comprises from about 35 to about 90 percent water. In various aspects, oil is present in the emulsion at from about 15 percent to about 75 percent. During the homogenization step, flavor(s) and color(s) can optionally be added, as desired. The emulsion is then dried. Drying can be achieved using methods known to those of skill in the art, such as freeze-drying and spray-drying, with spray-drying being a particularly effective method for drying the emulsion.

In various aspects or embodiments of the invention, the solid-state emulsion is then admixed with water wherein the water comprises from about 35 to about 90 percent of the admixture, and enzymes (transglutaminase and protease) are each added at from about 0.01 percent to about 0.25 percent of the admixture.

Products made by the method of the invention include products made by re-dispersing one or more solid-state emulsions, comprising vegetable protein and oil, in water and incubating the re-dispersed protein with transglutaminase (for a meat substitute) or a combination of transglutaminase and protease (for a dairy analogue) to produce a product that has properties appropriate for its use as a meat substitute or dairy analogue.

The invention also relates to a dried emulsion suitable for use as an ingredient in meat substitutes and/or meat extenders (and a method for making meat substitutes and/or meat extenders using the dried emulsion), the dried emulsion having limited ingredients while providing an improvement in texture in the meat substitute products into which it is incorporated. The emulsion is made by a method comprising the steps of admixing water and protein powder, the protein powder having a particle size (90 percentile) of from about 90 to about 120 microns, to produce a protein slurry, homogenizing the slurry with at least one fat to produce a pea protein emulsion, drying the emulsion to produce a solid-state emulsion.

A further aspect of the invention is a textured meat crumble comprising protein powder (e.g., powdered pea protein), water, and transglutaminase. Optional ingredients can comprise fat (e.g., vegetable oil), protease(s) and glutaminase. In a method for making the textured meat crumble, water and pea protein are admixed to provide a protein dough that comprises from about 55 to about 80 percent water. Transglutaminase is added to the protein and water at an enzyme concentration of from about 0.01 percent to about 0.25 percent of the admixture, and the protein dough is crumbled to provide dough pieces of diameter of from about 1 to about 30 millimeters. The dough crumbles are then incubated from about 15 minutes to about 8 hours at a temperature of from about 0° C. to about 70° C. to produce protein crumbles having a firmness, elasticity, and texture similar to that of ground meat.

Furthermore, the invention relates to a method for producing higher-moisture vegan meat products, such as deli meats and hot dogs, for example, as well as dairy analogues having a less solid structure, such as creams, yogurts, sour cream, etc., for example, by admixing water and protein powder to produce a protein slurry, homogenizing the slurry with at least one fat to produce a pea protein emulsion, and adding transglutaminase to the homogenized slurry. In various aspects of the method, the ratio of oil to protein in the emulsion is a 1:3 ratio. In certain embodiments of the method, the slurry is heated to 160 to 170 degrees Fahrenheit, then oil is added slowly, with shear. The pea protein/water/oil composition can be heated to about 175 degrees Fahrenheit, and homogenized at from about 3000 to about 4000 psi.

The invention also provides a method for making a meat substitute product, the method comprising admixing water and pea protein, the pea protein selected from the group consisting of powdered pea protein, at least one solid-state pea protein emulsion, and combinations thereof, to provide a first protein dough that comprises from about 55 to about 80 percent water; adding transglutaminase to the first protein dough at an enzyme concentration of from about 0.01 percent to about 0.25 percent of the first protein dough; crumbling the first protein dough to provide dough pieces of diameter of from about 1 to about 30 millimeters; incubating the dough pieces from about 15 minutes to about 8 hours at a temperature of from about 0° C. to about 70° C. to produce protein crumbles having a firmness, elasticity, and texture similar to that of ground meat, followed by at least one processing step selected from the group consisting of freezing the crumbles, increasing the temperature of the crumbled to inactivate the transglutaminase, cooking the crumbles, and combinations thereof; admixing pea protein with water, the pea protein selected from the group consisting of powdered pea protein, at least one solid-state pea protein emulsion, and combinations thereof, and at least one transglutaminase to form a binder wherein water comprises from 55-95 percent of the combination of the binder; admixing the binder with at least one of the protein crumbles to form a second protein dough wherein the ratio of the binder to the crumble is from about 20/80 to about 60/40; forming the second protein dough into at least one desired shape for the meat substitute to produce at least one formed dough product; and holding the at least one formed dough product for a period of from about 15 minutes to about 8 hours at a temperature of from about 0° C. to about 70° C. to produce a meat substitute product. The meat substitute product can then be processed by at least one processing step selected from the group consisting of freezing the crumbles, increasing the temperature of the crumbles to inactivate the transglutaminase, cooking the crumbles, and combinations thereof.

DETAILED DESCRIPTION

Figure 1:
FIG. 1 is a photograph of a product made by the method of the invention, wherein the product has been formed by crumbling the meat substitute produced after enzyme treatment to give a ground-chicken type product, as shown.
Figure 2:
FIG. 2 is a photograph of a light meat substitute made by the method of the invention, wherein the product has been formed by hand-rolling the meat substitute produced after enzyme treatment to give "meatballs," as shown.
Figure 3:
FIG. 3 is a photograph of the cooked product (meatballs), with spaghetti and sauce.
Figure 4:
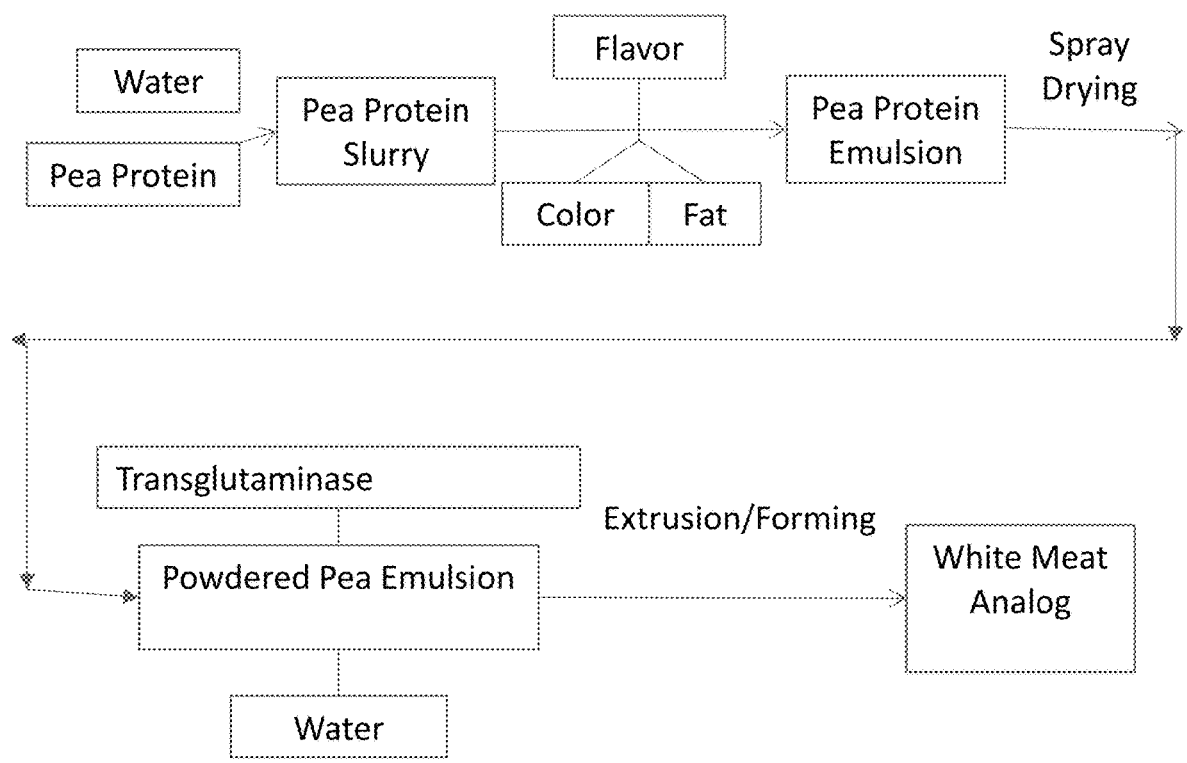
FIG. 4 is a flow diagram of the present method for making a meat substitute.
Figure 5:
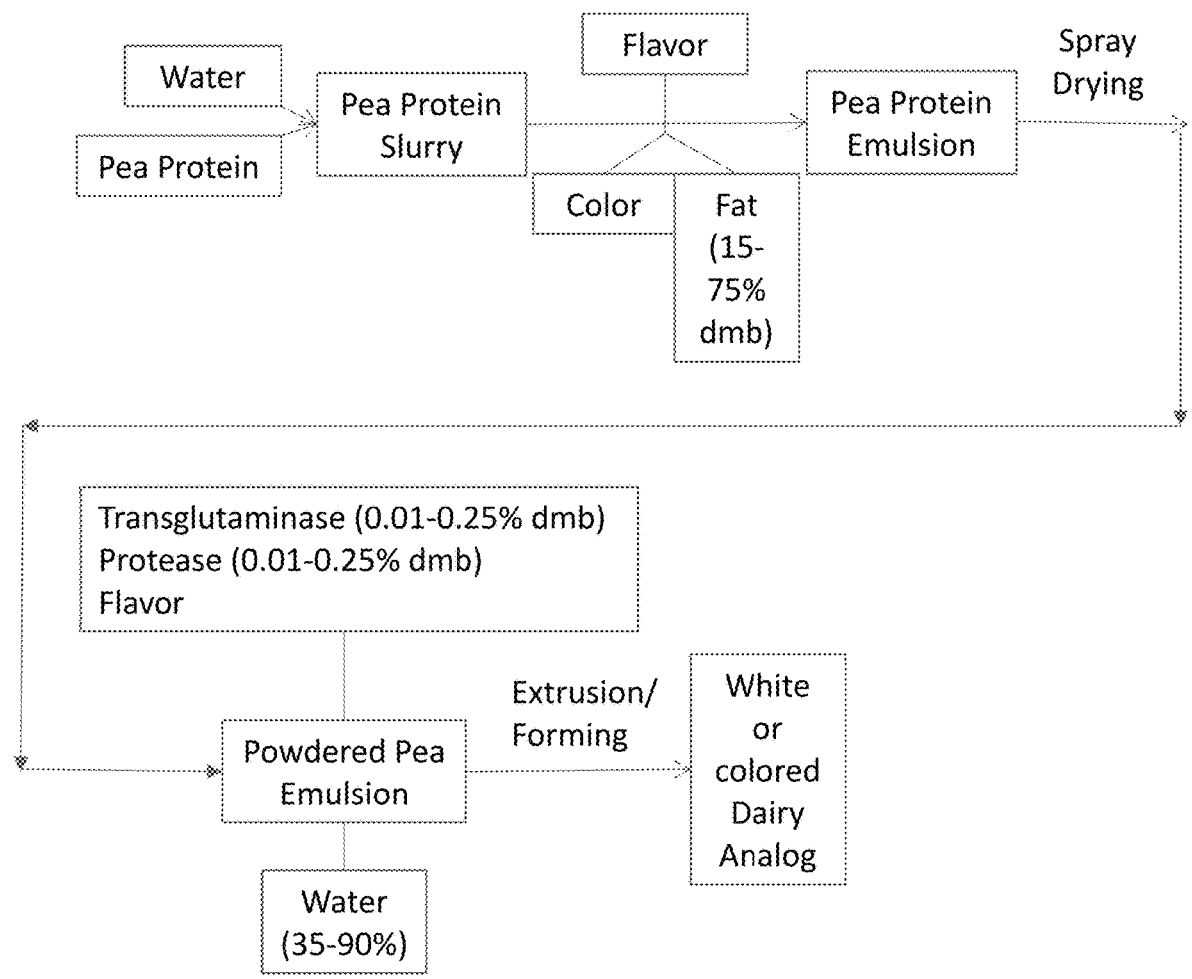
FIG. 5 is a flow diagram of the method for making a dairy analogue.

The present invention provides a method for producing a meat substitute, a dairy analog, and/or an egg replacement, and products made by the method in its various aspects and embodiments. The method is particularly effective for producing a vegan substitute for white meat, as it can produce a product having a color and texture resembling that of chicken, although darker products can also readily be made by the addition of desired coloring ingredients. Products made by the method can be made with few ingredients—protein, lipid (fat, oil), water, enzyme, and optional flavorings—to provide consumers with "clean label" meat alternatives that provide good taste and nutrition in forms that are familiar, such as ground meat, meatballs, etc. The inventors have also adapted the method to produce vegan "dairy" products (i.e., "dairy analogs" or "dairy analogues") that can also be made with only a few simple, nutritious, and minimally-processed ingredients. The ingredient panel for a prototype product of the invention is shown below in Table 2.

TABLE 2

| Product | Ingredient Listing Proposed for Product Packaging |
| --- | --- |
| Vegan Meat Substitute of the Invention | Water, pea protein, oil, optional coloring(s), optional flavoring(s) |

A "meat substitute" is a product that can also be referred to as a meat alternative, meat analogue, imitation meat, vegetarian meat, or vegan meat because, although it is made from plant or fungal protein, it provides similar aesthetic qualities (such as texture, flavor, appearance) or chemical characteristics (umami flavors, protein content, etc.) reminiscent of specific types of meat.

The method for making a meat substitute comprises the steps of admixing water and protein powder to produce a protein slurry, homogenizing the slurry with at least one fat (e.g., oil) to produce a pea protein emulsion, drying the emulsion to produce a solid-state emulsion, and admixing the solid-state emulsion with water and at least one transglutaminase to produce an admixture which, after an incubation period of from about 15 minutes to about 8 hours, produces a meat substitute composition. The meat substitute composition can then be formed into pieces of desired size and shape using various means known to those of skill in the art. For example, forming can be a continuous process using equipment such as the Nugget Former (Model NF, Heat and Control, Hayward, California), which can be set up to accept a continuous flow of the admixture containing transglutaminase. Using such equipment, thousands of pounds of product can be processed per hour, for example, and product shape and size can be adjusted using a rotating sleeve with a series of holes of different sizes and shapes and a variable speed paddle. Having been shaped, products can then be held for a period of time (from about 15 minutes to about 8 hours, for example) sufficient to allow the transglutaminase to crosslink the protein.

In aspects of the invention, the emulsion comprises from about 65 percent to about 95 percent water. In certain aspects, the emulsion comprises about 85 percent water. In various aspects, oil is present in the emulsion at a ratio of from about one parts oil to about three parts pea protein. For example, during the production of one product made by the inventors, the emulsion produced at this step in their method contained 11.25 percent pea protein, 3.75 percent oil, and 85 percent water in the emulsion. During the homogenization step, flavor(s) and color(s) can optionally be added, as desired. The emulsion is then dried. Drying can be achieved using methods known to those of skill in the art, such as freeze-drying and spray-drying. The inventors have found that spray-drying works particularly well, using an inlet temperature of 240 degrees Celsius and an outlet temperature of 92-92 degrees Celsius.

The product of the process of drying the protein/fat emulsion is referred to herein as a "solid-state emulsion." In the various embodiments of the invention, the solid-state emulsion can be admixed with water that comprises from about 60 to about 75 percent of the admixture, and in various aspects of the invention, transglutaminase is added at from about 0.01 percent to about 0.2 percent of the admixture. Transglutaminase (2.3.2.13, protein-glutamine:amine γ-glutamyltransferase) cross-links proteins by transferring the γ-carboxyamide group of the glutamine residue of one protein to the ε-amino group of the lysine residue of the same or another protein. Transglutaminase is commonly used in the food industry for a variety of applications, and it can be produced by a variety of bacteria such as, for example, *Streptomyces mobaraensis, Streptomyces libani, Bacillus circulans, Bacillus subtilis, Streptomyces ladakanum*. In 1989, microbial transglutaminase was isolated from *Streptoverticillium* sp. Transglutaminase is often provided in powder form, particularly for large-scale use in the food industry, and is available from a variety of commercial providers.

The invention also provides a dried emulsion—which will generally be referred to herein as a "solid-state emulsion"—for use in a variety of applications, most notably in the production of meat substitutes and/or meat extenders, and a method for making meat substitutes and/or meat extenders using the dried emulsion. The dried emulsion has a limited number of ingredients, all of which can be "natural" ingredients, providing a clean-label product that can produce an improvement in meat-like texture in the products into which it is incorporated. The emulsion is made by a method comprising the steps of admixing water and protein powder, the protein powder having a particle size (90 percentile) of from about 90 to about 120 microns, to produce a protein slurry (and hydrate the protein). The slurry is heated to 160 to 170 degrees Fahrenheit, then oil is added slowly, with shear. The pea protein/water/oil composition is then heated to about 175 degrees Fahrenheit, and homogenized at from about 3000 to about 4000 psi.

The inventors have discovered that by using the solid-state emulsion in the method of the invention it is now possible to make meat substitutes that have exceptional texture (moisture, elasticity, etc.) and taste, improving the quality of the cross-linked gels produced while decreasing the amount of transglutaminase that must be used to produce them. Shand et al. previously disclosed the use of transglutaminase to produce cross-linked gels from pea protein isolate (Shand, P. J., et al. Transglutaminase treatment of pea proteins: Effect on physicochemical and rheological properties of heat-induced protein gels, *Food Chemistry*, 107 (2008) 692-699). However, Shand also disclosed that gel characteristics of heat-induced gels of pea protein isolate "crosslinked at 0.7% MTGase addition level were between that of gels obtained for SPIc without enzymatic crosslinking and SPIc gels with 0.35% MTGase treatment . . . and also close to values for commercial meat bologna" (Shand 2008, p. 696). Therefore, although Shand found that TGase-crosslinking could be used to make pea protein gels, at twice as much transglutaminase the gel produced was still not equivalent to that from a transglutaminase-treated soy protein isolate. The method of the present invention allows for the use of significantly less enzyme, and even more importantly, produces superior quality gels, as the inventors have demonstrated by the quality of the final products—meatless substitutes, dairy analogues, etc.—that they have produced without the addition of other ingredients categorized as stabilizers, emulsifiers, etc.

Liang and Tang previously reported that pea protein could be used to stabilize emulsions, producing a Pickering-type stabilizing of oil-in-water emulsions. (Liang, H. and Tang, C., pH-dependent emulsifying properties of pea [*Pisum sativum* (L.)] proteins, *Food Hydrocolloids* (December 2013) 33(2): 309-319; Liang, H. and Tang, C., Pea protein exhibits a novel Pickering stabilization for oil-in-water emulsions at pH 3.0, *LWT-Food Science and Technology* (October 2014) 58(2): 463-469.) However, they and others used other ingredients, such as maltodextrin, corn syrup solids, and pectin, for example, to stabilize the emulsions sufficiently to allow them to be dried. The method of the present invention does not require the use of such additional stabilizers. Gharsallaoui et al., for example, improved the stabilization of pea protein emulsions using pectin, but in the side-by-side comparison, the pea protein emulsions without pectin also contained maltodextrin. (Gharsallaoui, A., et al. Utilisation of pectin coating to enhance spray-dry stability of pea protein-stabilised oil-in-water emulsions, *Food Chemistry* 122 (2010) 447-454.) Furthermore, in making the emulsions, hydration of the pea protein was performed using imidazole/acetate buffer, which is also not required for making a solid-state emulsion of the present invention.

The inventors have discovered that an emulsion consisting essentially of water, oil, and pea protein (that is, absent those kinds of emulsifying agents and stabilizers that have previously been considered necessary for producing such an emulsion) can be used to make meat substitute compositions. Furthermore, they have discovered that the emulsion works exceptionally well if homogenized to produce a more uniform particle size. In aspects of the invention, the emulsion comprises from about 65 percent to about 95 percent water. In certain aspects, the emulsion comprises about 85 percent water. Oil is present in the emulsion at a ratio of from about one parts oil to about 19 parts pea protein to a ratio of from about one parts oil to about 0.5 parts pea protein. Oil can be added to give a ratio of from about one parts oil to about three parts pea protein. In various aspects, the emulsion is homogenized at from about 3000 to about 4000 psi. Also, using this type of emulsion, meat substitutes and dairy analogues can be made that are lighter in color-more closely resembling many natural dairy products, as well as being more suitable as meat substitutes for lighter meats-particularly chicken. The lighter color also provides an advantage for making vegan dairy products such as, for example, vegan cheeses, and darker vegan/vegetarian meat products, because the lighter base allows for colorings such as yellows, oranges, and/or reds to be added without interference from the background color. An emulsion according to the invention should have a solids content of at least about 10 percent, and even more preferably at least about 15% for certain applications (e.g., formed products with higher moisture), and for applications for forming meat substitutes, a solids content of at least about 40% may be used.

Forming the meat substitute can be accomplished by a variety of means, and will depend upon the type of meat substitute that is desired. For example, a crumbled meat substitute, similar to ground chicken, can be produced by hand-crumbling the product, by extrusion, using coarse grinding, etc. Shaped products can be formed by hand (e.g., hand-rolled "meatballs"), can be made by pressing the product into molds, can be extruded, etc. Equipment and methods for forming individual types of products can easily be selected by one of skill in the art, based on the size and shape of the product that is desired.

The ratios of protein, fat, and water, as well as the incubation time with enzyme, can be varied to produce different kinds of products, products with different firmness, consistency, etc., based on the information provided herein to one of skill in the art. Size of protein particles can be important for the formation of a gel of sufficient strength to form a meat substitute. For the method of the invention, for example, a particle size (90 percentile) of from about 90 to about 120 microns can provide good results, and a particle size (90 percentile) of from about 10 to about 30 microns can be particularly effective. Starting material, which can be chosen by the formulator, should therefore be selected to provide an appropriate particle size.

The invention also provides a method for producing a vegan dairy analogue, as well as various dairy products made by the method. The method comprises the steps of admixing water and protein powder to produce a protein slurry, homogenizing the slurry with at least one fat (e.g., oil) to produce a pea protein emulsion, drying the emulsion to produce a solid-state emulsion, then admixing the solid-state emulsion with water, at least one transglutaminase, and at least one protease to produce an admixture which, after an incubation period of from about 15 minutes to about 8 hours, comprises a vegan dairy composition. In aspects of the invention, the emulsion comprises from about 35 to about 90 percent water. In various aspects, oil is present in the emulsion at from about 15 percent to about 75 percent. During the homogenization step, flavor(s) and color(s) can optionally be added, as desired. The emulsion is then dried. Drying can be achieved using methods known to those of skill in the art, such as freeze-drying and spray-drying, with spray-drying being a particularly effective method for drying the emulsion.

In various aspects or embodiments of the invention, the solid-state emulsion is then admixed with water wherein the water comprises from about 35 to about 90 percent of the admixture, and enzymes (transglutaminase and protease) are each added at from about 0.01 percent to about 0.25 percent of the admixture. By varying the fat, protein, and water content, as well as the incubation time for enzymatic action, one of skill in the art can use the method to produce vegan analogues of hard cheeses, butter, cream cheese, processed cheese, yogurt, Greek yogurt, pudding, sour cream, skyr, kefir, buttermilk, cream, and other similar dairy products.

The method of the invention can also be used to produce higher-moisture vegan egg products, such as scrambled egg crumbles or patties, for example, by admixing water and a combination of protein powders to produce a protein slurry, and adding transglutaminase to the slurry. The protein powders can comprise different ratios of protein to carbohydrate, and can be mixed to achieve a texture and mouthfeel approximating that of a soft gel after the addition of water and incubation with transglutaminase, the carbohydrate contributing to the development of a texture and mouthfeel similar to that of a cooked, scrambled egg. The gel can also be formed to produce an egg-like patty.

Commercial pea protein is readily available, pea protein being obtained by a process that begins with the outer shell of the pea (essentially consisting of insoluble fiber), being removed by mechanical action. After milling, a flour containing soluble fiber, starches, and proteins is obtained. Then, being water soluble, pea proteins can be separated from fiber and starch by wet filtration and centrifugation. The protein is precipitated to its isoelectric point, and then spray-dried.

The invention is described herein primarily as a method for preparing meat substitutes and dairy analogues using pea protein from *Pisum sativum* (e.g., split green peas or yellow peas), because pea protein can be used to produce a soy-free, gluten-free, high-protein product with superior nutritional composition. However, it will be understood by those of skill in the art that other types of vegetable protein, particularly those proteins derived from legumes, can also be used in the method. The inventors have found that protein derived from yellow split pea works very well to produce meat substitutes, especially white meat substitutes, that have good color, texture, and taste. Commercial pea protein isolates, for example, are generally made from yellow split peas. "Pulses," such as these peas, are naturally gluten-free, rarely trigger allergies and have been associated with health benefits such as reducing the risk of heart disease and type 2 diabetes. Products made by the method of the invention, using peas, give consumers a choice for replacing meat in their diets without consuming wheat, gluten, dairy, or soy which may be allergy triggers in some individuals. The method of the invention allows food manufacturers to utilize pea protein without requiring the addition of wheat, gluten, or soy to provide a product that holds together and has the texture required of a meat substitute.

It has been estimated that in some populations up to 80% or more of the individuals do not produce enough lactase to aid in digesting lactose from milk and other dairy products. Dairy analogues have, for this and other reasons (casein allergy, for example), become a popular alternative to traditional dairy products derived from bovine milk. Using the method of the invention, dairy analogues having the lighter color expected of milk-derived products such as cottage cheese, sour cream, etc., can be made with high-quality protein, but fewer other ingredients.

Emulsions of the invention can be packaged and provided to formulators in liquid form. Dried, solid-state emulsions produced by the method of the invention can also be packaged and provided to formulators in powder/granular form. The solid-state emulsions offer an advantage for formulation in that they allow tighter control of moisture levels—i.e., the desired level of water can readily be added to achieve a target level, whereas when liquid emulsions are used as starting material, varying target levels can be more difficult to achieve. Emulsions of the invention can be admixed with other products to provide meat substitute compositions, as can solid-state emulsions of the invention. Meat substitutes produced by the method of the invention can also be admixed with other products, such as, for example, textured vegetable protein (e.g., textured pea protein) to produce meat substitutes. In various aspects of those methods, transglutaminase can be incorporated into the admixtures to produce meat substitute compositions. Products of the invention can also be used to produce meat extenders, and may find use in the production of products such as deli meats, hot dogs (frankfurters), etc. Mixing meat, vegan meat, and or both, products with transglutaminase to bind the products together into a more cohesive mass is a technique that is known to those of skill in the art. Therefore, with the disclosure of the emulsions, solid-state emulsions, and meatless substitute products of the invention, formulators have a variety of new options for the production of existing products, and new products.

One product that can be used either alone, or in conjunction with, emulsions of the invention, is a vegetarian/vegan meat crumble formed of pea protein. Vegan meat crumbles are known to those of skill in the art and are commercially available. They can be used to make vegan hamburger patties or vegan sausage patties, for example, or they can be used as ingredients in a variety of products such as tacos, spaghetti sauces, and other products in which meat such as hamburger is often incorporated. Plant protein crumbles can also be used as texturizers for a variety of products, including meat products. Protein crumbles of the present invention, however, comprise primarily pea protein powder and water, with transglutaminase added to crosslink the protein to achieve a desired texture, elasticity, and firmness. Optional ingredients can comprise those selected from the group consisting of fat(s), oil(s), protease(s), glutaminase(s), and combinations thereof, for example. Ingredients for addition to the basic protein crumble can be readily selected by those of skill in the art, with the protein crumble being made by a method comprising the steps of admixing water and pea protein to provide a protein dough that comprises from about 55 to about 80 percent water, adding transglutaminase to the dough at an enzyme concentration of from about 0.01 percent to about 0.25 percent of the dough, crumbling the protein dough to provide dough pieces of diameter of from about 1 to about 30 millimeters, and incubating the dough pieces at a temperature of from about 0° C. to about 70° C., with the incubation time being from about 15 minutes to about 8 hours. Transglutaminase can be added to the dough by a variety of means such as, for example, admixing transglutaminase with powdered pea protein, then admixing the pea protein/transglutaminase with water; admixing transglutaminase with water, then admixing the water/transglutaminase with pea protein; and/or adding transglutaminase to the pea protein/water admixture to form the dough.

Various properties are important to the development of meatless protein products having the qualities desired by consumers. Without thinking specifically about the product qualities, consumers expect a certain degree of "chewiness" in a meat substitute, similar to that of meat. The product must therefore have the requisite degree of elasticity (the ability to deform without breaking). The product should also resist deformation to a degree similar to that of meat—and this is referred to as the product's "firmness." Additionally, meat substitutes should have a feeling (especially as it regards to mouthfeel) and consistency as similar to that of meat as possible, this being assessed as the product is being chewed, and that is described as the product's "texture." Transglutaminase has been described as having the potential to improve firmness, viscosity, elasticity and water-binding capacity of food products (Kieliszek, M. et al. Microbial transglutaminase and its application in the food industry. A review, *Folia Microbiol* (Praha), 2014: 59(3), 241-250). However, the inventors have discovered that by forming a protein dough, crumbling the dough, and incubating the crumbled dough, transglutaminase treatment can be used to manipulate firmness, texture, and elasticity of a plant-based meat substitute to provide a crumble product that has a firmness, texture, and elasticity very similar to that of meat.

Traditionally, hamburger has been formed by grinding meat, and vegetarian or vegan meat crumbles have been formed by combining ingredients to form them into a "solidified" product that that is cooked (in part, to stabilize the shape), and then that solidified product is crumbled. In the method of the invention, the "solidification" step occurs after the crumble is formed by breaking apart the protein dough, and is accomplished by incubating the crumbled dough to which transglutaminase has been added. This method produces a product that can be made entirely out of protein and water, with optional ingredients such as flavorings, spices, added nutrients, additional enzymes, etc.

Similar combinations of ingredients can, if combined in different ways, provide significantly different products. For example, bakers know that flour, butter, and sugar can be combined with fruit in a variety of ways, and with or without the addition of milk, egg, or grain such as oatmeal, to produce products known as crisps, cobblers, buckles, pandowdies, grunts, clafoutis, etc. Varying the moisture levels, forming crumbly mixtures, etc., can produce significantly different products. The inventors have discovered that forming a dough of protein powder and water, the dough having a moisture level that facilitates crumbling of the dough to form crumbles of desired size (e.g., diameters from about 1 to about 30 millimeters), and incorporating into the dough at least one transglutaminase at an enzyme concentration of from about 0.01 percent to about 0.25 percent of the dough by weight, produces crumbles having a distinctly meat-like combination of firmness, elasticity, and texture upon incubation of those crumbles for a period of from about 15 minutes to about 8 hours, the incubation time being determined by one of skill in the art according to the degree of firmness, elasticity, and texture desired.

Using the method of the invention, protein crumbles can be produced with varying properties, optimizing them for their intended uses and the products into which they may be incorporated. A firmer crumble, for example, could be better for use in a sausage patty or meatball, while a less firm crumble could be better suited for use in a product such as link sausage. The parameters of the method allow one of skill in the art to optimize the enzyme action, pH, moisture, and mechanical processing in order to account for the different intended uses for a specific crumble formulation. Using more enzyme will generally produce a firmer product, but using too much can cause the crosslinking to occur too quickly, resulting in a formulation that can either become too firm before the enzyme is inactivated or can fail to form a crumble at all. Too little water can result in a mix that will not form a dough that can be crumbled, but with too much water the dough can become too cohesive, or sticky, to be crumbled. Within the parameters disclosed in the method, however, one can modify the crumble size, for example, to increase it by the addition of water to the mix and decrease it by using less water. Smaller crumbles can produce a denser and firmer product. Decreasing the pH from neutral to slightly acidic (e.g., pH 4-5) can be used to produce a product with significantly softened texture. It is generally not advisable, however, to decrease the pH beyond that point, as it can result in such decreased elasticity and firmness that the texture does not resemble that of meat.

Vegan meat crumbles made by the method of the invention can be used to produce products such as patties, burgers, nuggets, sausages, and other items which are customarily made from meat. To produce crumbles for incorporation into a finished product, one of skill in the art may choose to leave the crumble uncooked after its incubation period has ended, combining it with other ingredients (e.g. egg, gums, an emulsified protein binder, etc.) before cooking the product produced therefrom. Alternatively, crumbles can be cooked, generally at a temperature of from about 122° F. to about 375° F., and at that point the cooked crumbles can be eaten alone, in salads, tacos, or other products into which ground or chipped meat is often incorporated, or the cooked crumbles can be combined with other ingredients and the combination can undergo further cooking (e.g., as in a meatloaf).

It should be understood by those of skill in the art that the surface of crumbles is irregular. Therefore, the diameter of an individual crumble is generally a measurement of the widest or longest cross-section of that individual crumble. Formation of the crumbles by admixing the protein powder with a sufficient amount of water to prepare a dough that can readily be crumbled provides a crumble shape that is fixed in place, in relative terms, upon incubation of the transglutaminase-containing crumbles.

The invention also provides a method for making a meat substitute product that can be made from the meat crumbles, the method comprising making crumbles by admixing water and pea protein, the pea protein selected from the group consisting of powdered pea protein, at least one solid-state pea protein emulsion, and combinations thereof, to provide a first protein dough that comprises from about 55 to about 80 percent water; adding transglutaminase to the first protein dough at an enzyme concentration of from about 0.01 percent to about 0.25 percent of the first protein dough; crumbling the first protein dough to provide dough pieces of diameter of from about 1 to about 30 millimeters; and incubating the dough pieces from about 15 minutes to about 8 hours at a temperature of from about 0° C. to about 70° C. to produce protein crumbles having a firmness, elasticity, and texture similar to that of ground meat, followed by at least one processing step selected from the group consisting of freezing the dough, increasing the temperature of the dough to inactivate the transglutaminase, cooking the dough, and combinations thereof. A binder is then made for use in a product comprising meat crumbles by admixing pea protein with water, the pea protein selected from the group consisting of powdered pea protein, at least one solid-state pea protein emulsion, and combinations thereof, and at least one transglutaminase to form the binder wherein water comprises from 55-95 percent of the combination of the binder. The binder is admixed with at least one of the protein crumbles to form a second protein dough wherein the ratio of the binder to the crumble is from about 20/80 to about 60/40; forming the second protein dough into at least one desired shape for the meat substitute to produce at least one formed dough; and holding at least one formed dough from about 15 minutes to about 8 hours at a temperature of from about 0° C. to about 70° C. to produce a meat substitute product, followed by at least one processing step selected from the group consisting of freezing the meat substitute product, increasing the temperature of the meat substitute product to inactivate the transglutaminase, cooking the meat substitute product, and combinations thereof. Cooking the meat substitute product can be performed at a temperature of from about 122° F. to about 375° F., for example, and can be accomplished by various means known to those of skill in the art, such as frying, baking, and microwaving, for example. Those of skill in the art will recognize that at the appropriate time (i.e., when the desired firmness, elasticity, texture, etc., of the meat substitute product has been achieved by incubating the binder, crumbles, and transglutaminase) it is advantageous to decrease the temperature (e.g., by freezing) or increase the temperature (e.g., by the addition of heat, including, for example, by cooking methods such frying, baking, and/or microwaving) of the meat substitute product to inactivate the transglutaminase.

The method can also be used to produce vegan meat products with modified mouthfeel, resembling softer forms of ground beef or pork, by admixing water, vegetable oil and protein powder to produce a protein slurry, and adding transglutaminase to the homogenized slurry. In various aspects of the method, the oil content is 1-25%. After the addition of water, oil, and transglutaminase to the protein powder, the resulting product has a texture and mouthfeel approximating that of a softer, less brittle gel, similar to the texture and mouthfeel of a cooked ground beef or pork. The gel can then be formed into a desired shaped (i.e. crumble, patty, etc.).

The invention has been described in various aspects which demonstrate the significant utility of the method for using protein slurries, emulsions, and solid-state emulsions disclosed herein for the production of meat substitutes, dairy analogs, and egg replacements. Where the term "comprising" is used herein to describe a method or composition, it should be understood that the terms "consisting of" and "consisting essentially of" can also be used to describe the method or composition in a narrower construction of the steps or component parts. The invention can be further described by means of the following non-limiting examples.

EXAMPLES

Product Texture for Meat Substitutes

Vegan meat substitutes were prepared as described above, using 75 g pea protein, 25 g canola oil, 150 g water, 0.2 g 1000 U transglutaminase (TG-S802, Taixing Dongsheng Food Science and Technology Co.). Texture (firmness) was analyzed using a Texture 2 analyzer, with knife attachment. Results are shown in Table 3 below.

TABLE 3

Product Texture/Firmness Comparison

| | Product Firmness Using Dried Pea Protein Emulsion | Product Firmness Using Standard Pea Protein (Glanbia HarvestPro ® Pea 85) |
|---|---|---|
| 6 min 20 sec | 285.5 g | 138.4 g |
| 10 min | 323.2 g | 163.0 g |
| 15 min | 384.7 g | 206.7 g |
| 20 min | 418.8 g | 235.2 g |

TABLE 3-continued

Product Texture/Firmness Comparison

|  | Product Firmness Using Dried Pea Protein Emulsion | Product Firmness Using Standard Pea Protein (Glanbia HarvestPro ® Pea 85) |
| --- | --- | --- |
| 30 min | 491.7 g | 314.5 g |
| 45 min | 864.6 g | 379.8 g |
| 60 min | 1200.5 g | 459.4 g |
| 75 min | 1505.1 g | 552.5 g |

Product color was analyzed using a Hunter Labscan® Colorimeter, with "L" being a measurement of light to dark color components, "a" being a red-green scale, and "b" being a yellow-blue scale. Results are shown below in Table 4, and can be compared to the results shown in Table 5 for controls formed of homogenized pea protein and titanium dioxide (white pigment) without oil.

TABLE 4

Color Data

|  | L | a | b |
| --- | --- | --- | --- |
| Pea Protein and no oil without homogenization | 70.61 | 5.56 | 21.34 |
| Pea protein and no oil with homogenization | 74.60 | 4.23 | 17.59 |
| Pea protein and coconut oil (25%) with homogenization | 81.73 | 2.99 | 15.10 |
| Pea protein and canola oil (25%) with homogenization | 83.05 | 2.74 | 14.21 |

TABLE 5

Color Data - Pea Protein and Titanium Dioxide

|  | L | a | b |
| --- | --- | --- | --- |
| Titanium dioxide 0% | 74.60 | 4.23 | 17.59 |
| Titanium dioxide 0.1% | 75.04 | 4.23 | 17.63 |
| Titanium dioxide 0.2% | 76.63 | 4.05 | 17.47 |
| Titanium dioxide 0.4% | 78.13 | 3.79 | 17.17 |
| Titanium dioxide 0.8% | 80.14 | 3.47 | 16.62 |

(Titanium dioxide addition expressed as percentage of pea proten.)

Effect of Particle Size on Formation of Meat Substitutes

Particle size comparison was performed on three pea protein products-regular pea protein, milled pea protein, and a pea protein/canola oil blend containing 25% canola. Gel strength comparison was then made between pea protein and milled pea protein processed according to the method of the invention, using (150 g water, 75 g pea protein, 25 g canola oil, 0.25 g TGase). Analysis included mean volume diameter (MV), mean number diameter (MN), and mean area (MA, a particle surface measurement). Results are shown in Table 6.

TABLE 6

|  | Pea Protein | Milled Pea Protein | 25% Canola/ Pea Protein |
| --- | --- | --- | --- |
| MV (um) | 62.92 | 49.03 | 11.86 |
| MN (um) | 21.54 | 16.86 | 4.55 |
| MA (um) | 45.77 | 36.37 | 8.47 |

Size distribution for each product was analyzed, with results shown in Table 7.

TABLE 7

| Pea Protein (unaltered) | 1× milled Pea Protein | 2× Milled Pea Protein | Pea protein (spray dried in house) | 25% Canola Pea Emulsion (spray dried in house) |
| --- | --- | --- | --- | --- |
| 25.99 | 20.78 | 6.58 | 9.75 | 4.58 |
| 34.75 | 28.15 | 10.04 | 19.5 | 6.08 |
| 42.34 | 34.18 | 12.62 | 27.32 | 7.52 |
| 49.31 | 39.65 | 15.08 | 34.43 | 8.95 |
| 56.12 | 45 | 17.76 | 41.57 | 10.37 |
| 63.32 | 50.64 | 20.92 | 49.38 | 11.9 |
| 71.66 | 57.04 | 24.93 | 58.52 | 13.67 |
| 83.1 | 65.39 | 30.62 | 70.74 | 16.09 |
| 104.6 | 79.7 | 40.68 | 93.15 | 20.51 |
| 131.7 | 95.93 | 51.48 | 120.3 | 25.67 |

Results demonstrate that the milled pea protein particles are smaller, on average, than those of the pea protein, and the canola/pea protein blend has the smallest particle size.

Figure 6:
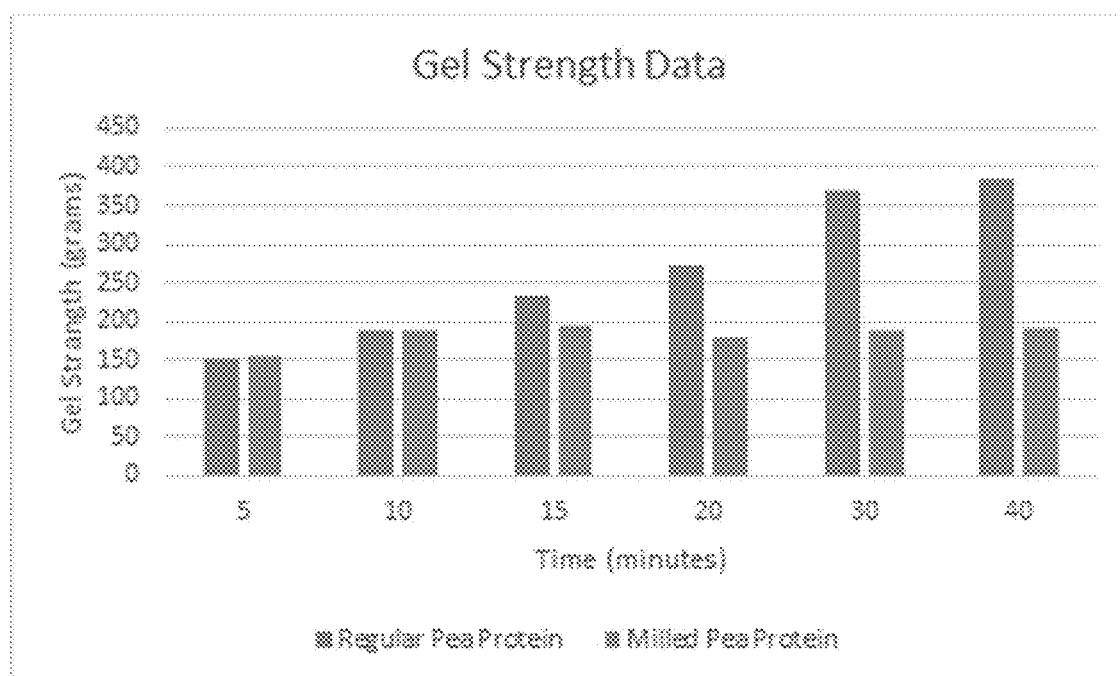
FIG. 6 is a graph illustrating the difference in gel strength over incubation time when pea protein (larger particle size) and milled pea protein (smaller particle size) are used in the formulation. For each pair, the bar on the left represents the value for regular pea protein and the bar on the right represents the value for milled pea protein.
Figure 7:
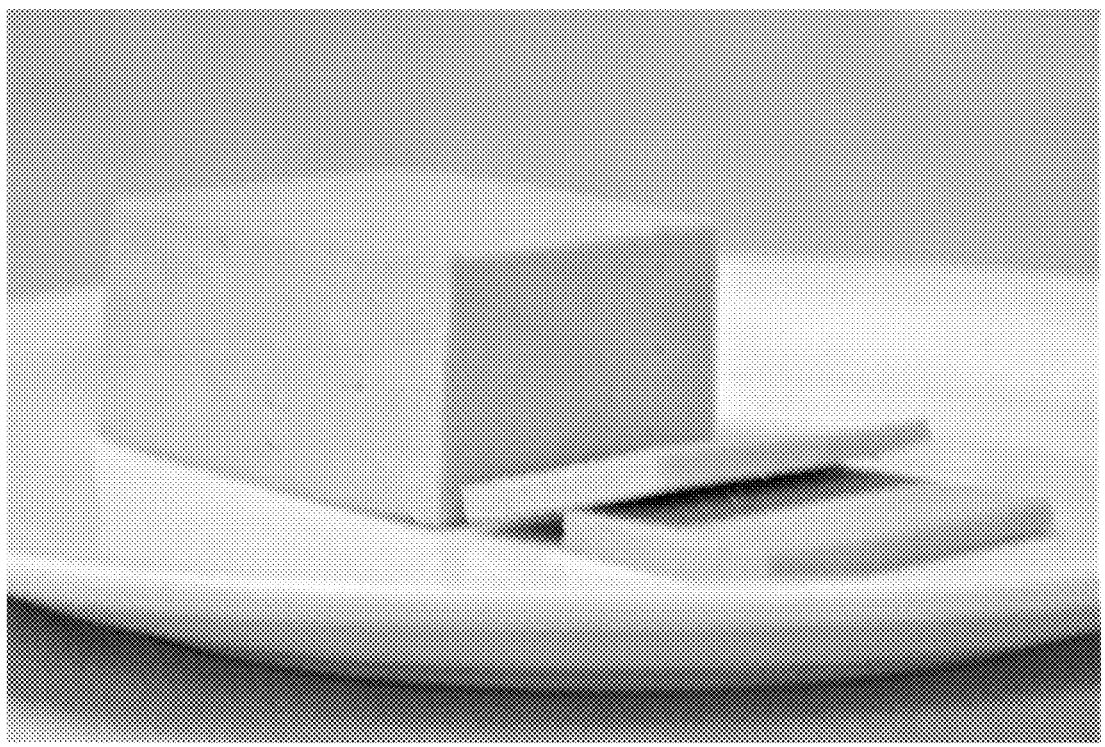
FIG. 7 is a photograph of a cheese product made by the method of the invention.
Figure 8:
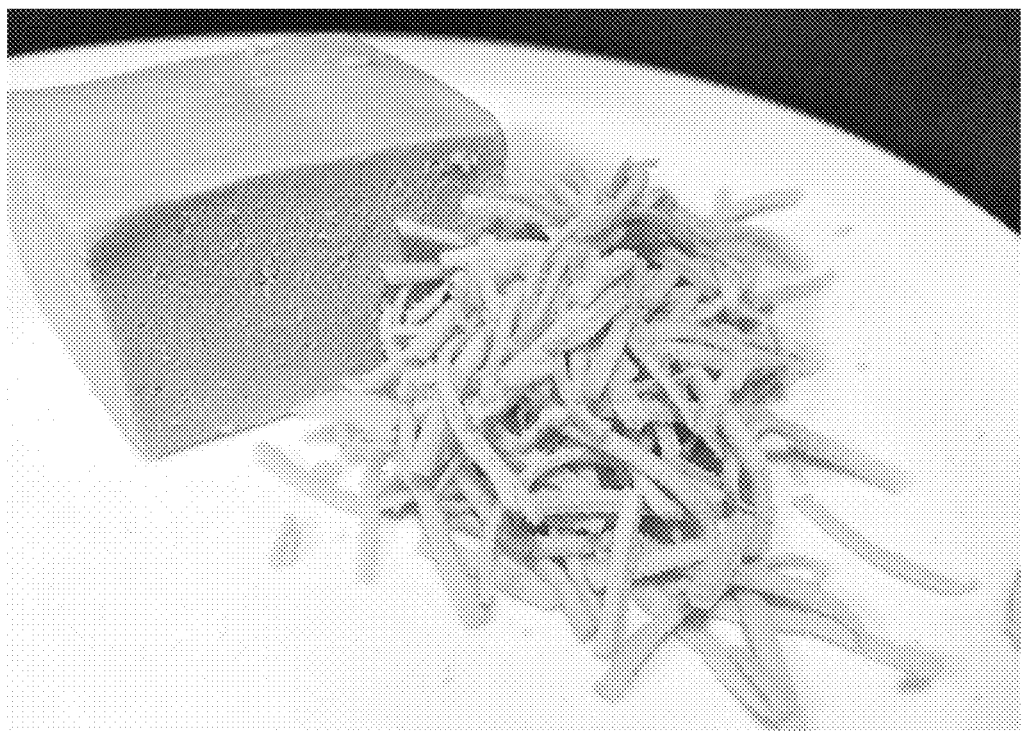
FIG. 8 is a photograph of a shredded cheese product made by the method of the invention.
Figure 9:
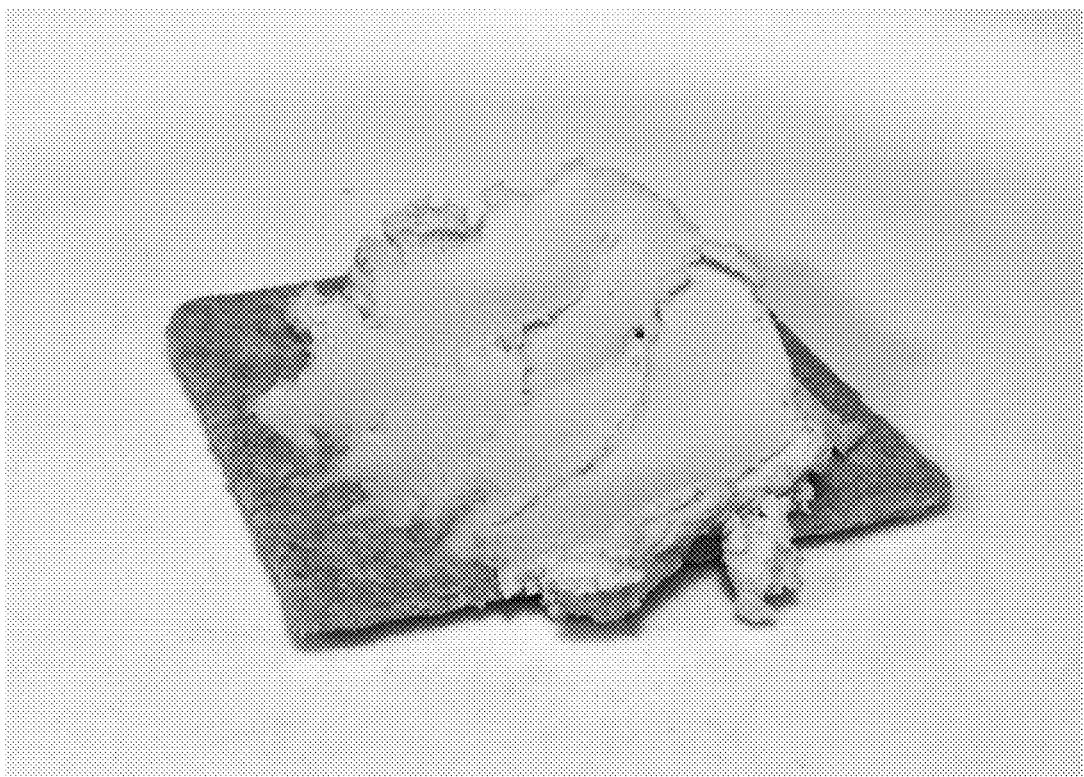
FIG. 9 is a photograph of a cheese suitable for use as a spread, also made by the method of the invention.

Gel strength was tested after various incubation times with transglutaminase, using regular pea protein (larger size particles) and milled pea protein (smaller size particles) for comparison. Results are shown in Table 8 and in the graph in FIG. 6.

TABLE 8

Gel Strength of Meat Substitute Products at Various Incubation Time Points

|  | 5 min | 10 min | 15 min | 20 min | 30 min | 45 min | 60 min |
| --- | --- | --- | --- | --- | --- | --- | --- |
| Jetmill 1× | 130.5 | 188.35 | 221.02 | 249.14 | 290.52 | 407 | 422 |
| Jetmill 2× | 187.4 | 207.4 | 225.6 | 211.5 | 312.1 | 389.8 | 470.7 |
| Pea Protein (spray-dried in house) | 194.6 | 248.6 | 256.2 | 272 | 334.6 | 441.3 | 557.8 |
| HarvestPro 85 (Pea protein, unaltered) | 169.9 | 173.4 | 214.6 | 227.3 | 291.2 | 347.4 | 387 |

As indicated by the numbers in Table 8, gels are stronger when pea protein with larger particle size, within a range of from about 90 to about 120 (90 percentile), is used.

Preparation of a Protein Crumble

A protein crumble was formed of 15 g pea protein powder, 35 g water, 0.75 g seasoning/flavors, 0.075 g coloring, and 0.075 g transglutaminase (1000 U). Transglutaminase, seasonings and colorings were admixed with the dry protein powder. In a mixer at low speed, water was slowly added to the dry mix. Mixing was continued for approximately 20 seconds, until the crumble reached the desired size. The crumble was then incubated at refrigeration temperature for 1 hour.

Preparation of a Vegan Meat Patty Made from a Pea Protein Crumble

Figure 10:
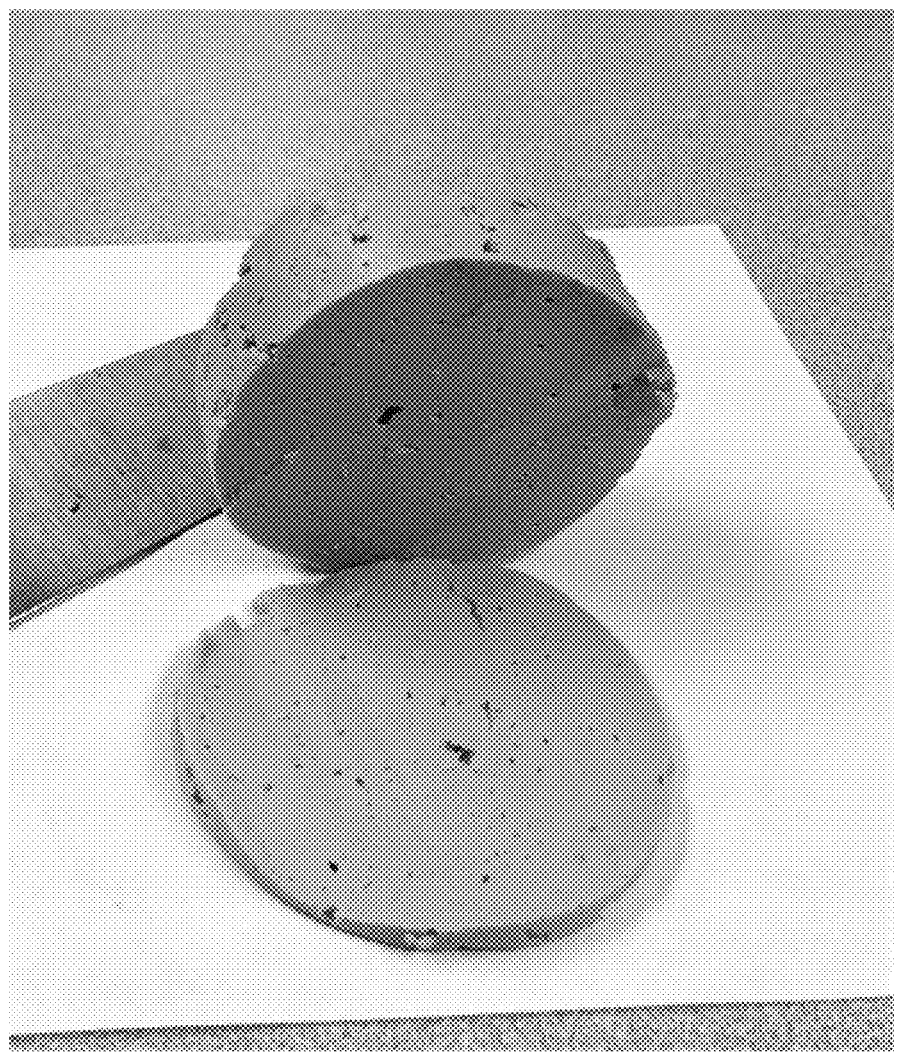
FIG. 10 is a photo of a vegan deli meat product (vegan bologna) made by the method of the invention.
Figure 11:
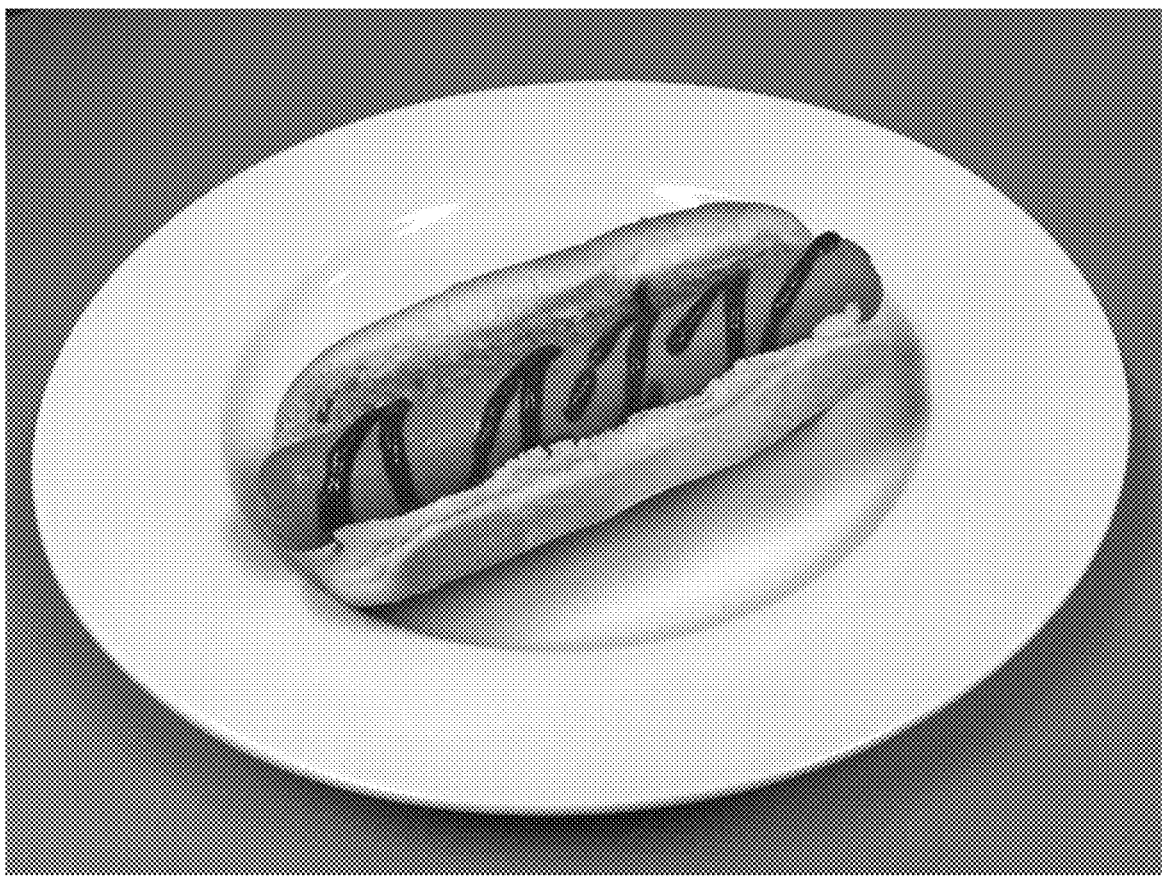
FIG. 11 is a photo of a frankfurter (hot dog) made by the method of the invention.
Figure 12:
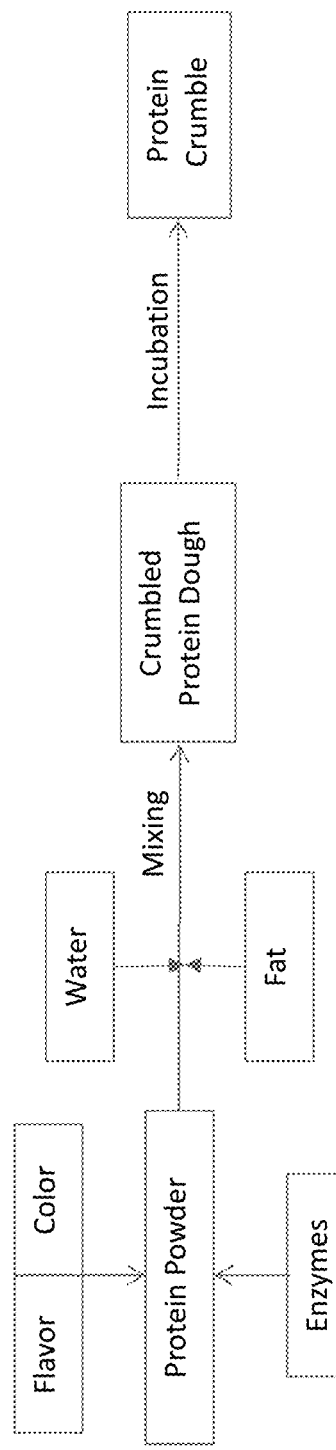
FIG. 12 is a flow diagram of a method for making a protein crumble according to the invention.
Figure 13:
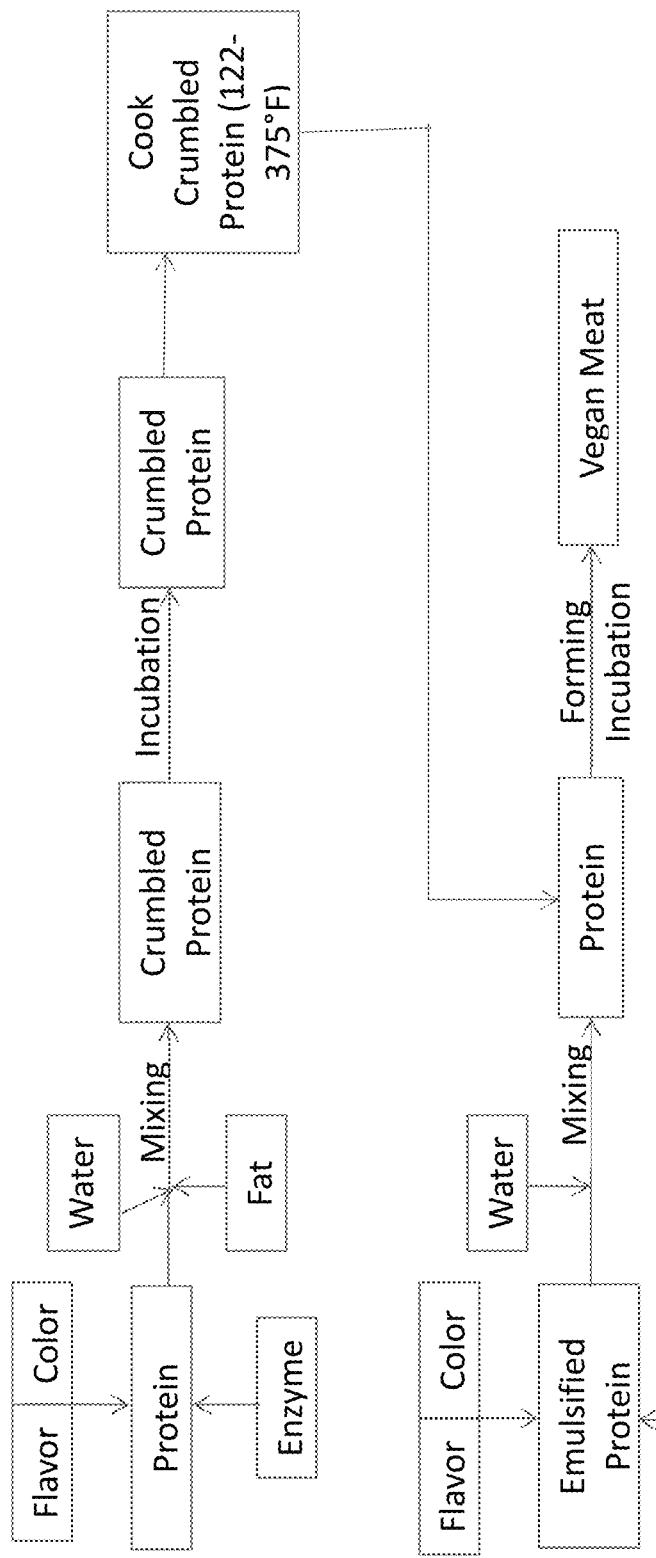
FIG. 13 is a flow diagram of a method for making a protein crumble and protein binder to be combined to form a protein crumble patty.
Figure 14:
FIG. 14 is a photograph of a "hamburger" patty made using a protein crumble product of the invention.
Figure 15:
FIG. 15 is a photograph of a sausage, egg, and cheese biscuit-illustrating the versatility of the method of the invention, as the sausage, egg, and cheese were all made by the method of the invention.

Ten grams of pea protein/canola oil emulsion (75/25%), 20 g water, 1 g seasoning/flavors, 0.1 g coloring, and 0.05 g transglutaminase (1000 U) were used as ingredients. Transglutaminase, seasonings, and coloring were added to the dry protein emulsion powder and mixed. In a mixer on low speed, water was slowly added to the dry mix. Mixing continued for approximately 30 seconds, to fully hydrate the dry mix. To 30 g of the freshly-hydrated mix (hydrated binder powder), 50 g crumble was added and mixing of the binder powder and crumble continued until the binder was completely incorporated into the binder/crumble mix. The mix was then formed into patties and incubated for 45 minutes. The resulting patties were cooked to 165° F. internal temperature in a frying pan. FIG. 10 shows a photograph of the resulting fried patties.

Effect of Incubation Time on Firmness of Dough Crumbles

Crumbles made as described above were evaluated for firmness based on compression testing. Results are shown in Table 9, where lower time to 10,000 g force equates to a firmer, harder dough.

TABLE 9

| Compression Data - Protein Crumbles | | |
|---|---|---|
| Time (min) | No TG | TG |
| 5 | 13.735 | 11.935 |
| 10 | 13.4625 | 12.6975 |
| 15 | 12.23 | 10.9875 |
| 20 | 12.57 | 8.887 |
| 30 | 13.2125 | 7.71 |
| 45 | 12.275 | 7.4975 |
| 60 | 12.9175 | 7.135 |

What is claimed is:

1. A method for forming a crumbled meat substitute, the method comprising
    (a) crumbling a protein dough comprising pea protein powder, water, and transglutaminase to produce a protein dough crumble; and
    (b) incubating the protein dough crumbles to firm and texturize the protein dough crumbles to produce the crumbled meat substitute.

2. The method of claim 1 wherein the crumbled meat substitute is cooked to set the shape and texture of the crumbled meat substitute.

3. The method of claim 1, further comprising the steps of
    (i) admixing the water and the pea protein powder to provide the protein dough, wherein the protein dough comprises from about 55 to about 80 percent water; and
    ii) adding the transglutaminase to the protein dough at an enzyme concentration of from about 0.01 percent to about 0.25 percent of the protein dough;
    wherein steps (i) and (ii) are performed prior to steps (a) and (b).

4. The method of claim 1, wherein crumbling the protein dough in step (a) further comprises crumbling the protein dough to provide protein dough pieces of diameter of from about 1 to about 30 millimeters.

5. The method of claim 1, wherein incubating the protein dough crumbles in step (b) further comprises incubating the protein dough pieces from about 15 minutes to about 8 hours at a temperature of from about 0° C. to about 70° C. to produce the crumbled meat substitute having a firmness, elasticity, and texture similar to that of ground meat.

6. A composition produced according to the method of claim 1, the composition consisting essentially of the protein powder, the water, the transglutaminase, and optionally, fat and/or oil.

* * * * *